United States Patent Office 3,185,579
Patented May 25, 1965

3,185,579
PACKAGING OF FRESHLY BAKED BREAD
Rudolf Dehne, Dr. Heinrich-Jasperstrasse 31,
Bad Harzburg-Bundheim, Germany
No Drawing. Filed Nov. 5, 1962, Ser. No. 235,914
Claims priority, application Germany, Jan. 5, 1955,
D 19,438
17 Claims. (Cl. 99—172)

The present invention relates to new and useful improvements in the packaging of fresh bread, such as sliced bread, and more particularly to the packaging of freshly baked bread which has been aged and moistened, thereafter hermetically sealed in a foil under vacuum, sterilized in that condition, and immediately thereafter rapidly cooled to substantially below room temperature.

This application is a continuation-in-part of copending U.S. application Serial No. 556,432, filed December 30, 1955, now abandoned.

It is known to package fresh bread in transparent, flexible plastic envelopes or wrappers in order to keep the same fresh and to facilitate the marketability of such products. These transparent plastic envelopes or bags are cheaper to use than tin cans, and additionally the use of plastic bags has a certain amount of sales appeal due to the fact that the purchaser can inspect the merchandise through the transparent bag.

Fresh foodstuffs, such as fresh sliced bread, as for example pumpernickel, have been packaged in hermetically sealed condition in transparent, thin polyethylene foil. The bread is usually placed in a polyethylene bag formed of the foil and the open end of the bag is then hermetically sealed, such as by heat sealing the same. While this mode of packaging prevents contamination after the sealing has taken place, microorganisms, such as mold present in the bread in the bag at the time of sealing, prevent storage of the bread for extended periods of time.

It has been attempted in this connection to sterilize the bread while in the bag. In accordance with one known method, the completely packaged bread is sterilized in saturated steam. In this connection, however, the air enclosed in the bag at the time of sealing expands considerably and may cause the bag to burst.

In order to prevent this adverse effect, an alternate procedure has been used in which the bag is provided with a hole through which the excess air can escape upon expansion during the sterilization. Such hole is then closed with a transparent adhesive tape, once the sterilization has been effected, but this hole potentially provides a source of contamination, and where the same is used, the closure can never be rendered permanently air-and-moisture-tight. Experience has shown that fresh bread does not keep in these packages over prolonged periods of time.

In accordance with a further proposal, the food in question has been sterilized prior to being placed in the bag, whereupon the bag is hermetically sealed. Such proposal, however, has not proven satisfactory since bread tends to become recontaminated with microorganisms, such as mold and bacteria, upon being placed in the plastic bag, and thereafter sealed therewithin. Accordingly, such contamination prevents storage of the packaged bread without spoiling, even for a comparatively short period of time.

Bread, including packaged bread, is normally sold as a fresh, baked product, and due to the peculiar characteristics of baked goods, such as bread, the flavor, texture, freshness, appearance, etc. thereof are easily detrimentally affected. Generally, after a few days of standing, baked bread is considered stale. Because of the critical characteristics of bread, the same cannot be subjected to hot temperature treatments, which may be used conventionally in the preservation of other foods. Since baked bread is synthesized, rather than obtained in natural form, as in the case with vegetables, fruits, meats, etc., baked bread possesses a relatively low moisture content as compared with such other foods. Significantly, this moisture content is extremely critical to baked bread, since the fresh taste and appearance of the break will be detrimentally affected by a relatively narrow variation in the moisture content outside of the critical range thereof.

It will be appreciated that the marketability of baked bread will be destroyed not only by reason of the impairment of the fresh taste and appearance of the same, but also by reason of the presence of very resistant bacteria, such as the chalk mold which is often found in bread. With respect to the latter consideration, although various techniques have been used in the art to sterilize bread for packaging and storage over extended periods of time, at normal temperatures, one or more inherent factors traceable to the baked bread itself have prevented a successful, simple, and economical packaging operation for bread.

It is an object of the present invention to overcome the foregoing drawbacks and to provide a process for the packaging and sterilization of baked bread, such as sliced bread, in transparent, polyolefin foil wrappings, using a particular sequence of steps which result in a product free from the foregoing disadvantages.

Other and further objects of the invention will become apparent from a study of the within specification and accompanying examples.

It has been found in accordance with the present invention that a simple, economical, and efficient process for packaging freshly baked bread may be provided, which comprises aging the baked bread mass by allowing the mass to stand for a period of at least about six hours immediately after baking to cool and to structurally stabilize or solidify the comparatively hot, soft mass, next moistening just the surface of the mass to soften slightly the outermost crispy surface portion thereof without softening the interior portion of such mass, then hermetically sealing the mass in a flexible, heat-sealable polyolefin foil under a vacuum of at least about 0.8 atmospheric absolute, sterilizing the mass hermetically sealed in the polyolefin foil at a temperature between about 70 and 120 degrees C. for a period of about 1 to 3 hours, and immediately thereafter cooling the sterilized hermetically sealed mass rapidly to at least about 10° C.

In accordance with a preferred embodiment of the invention, the baked bread mass may be in the form of sliced bread, such as rye bread or pumpernickel bread, and the polyolefin foil used may be of such dimensions that the expanded volume of the foil containing the bread is between about 25 and 50% greater than the corresponding volume of the bread itself. The aging may be effected for a period between about 6 and 20 hours, depending upon the type of baked goods being treated. An aging period of more than 15 to 20 hours is without any essential effect on the bread, but is undesirable from an economical point of view. The moistening may be effected for a period between about 1 and 3 hours to take up between about 0.5 and 5% moisture (based on the moisture content of the whole bread) in the bread surface. The hermetic sealing may be effected under a vacuum between about 0.3 and 0.8 atmosphere absolute in a transparent, flexible polyolefin foil essentially free from softeners and plasticizers and having a thickness between about 0.03 to 0.1 mm. and having a volume of about 125 to 150% of the volume of the baked goods mass. The sterilizing may be effected at about 90 to 100° C. to achieve a sterilizing temperature of 70 to 87° C., and preferably 77 to 87° C., in the interior of the bread mass, and the subsequent cooling may be between 10 and 0° C.

It is desirable to use an amount of foil which is somewhat more than is necessary to completely cover the mass of baked goods therewithin. The foil to be used is a polyolefin foil, such as polyethylene or polypropylene, the same being of a thickness less than 0.15 mm., i.e. 0.03 to 0.1 mm. and thus slightly permeable to oxygen yet simultaneously impermeable to the passage of bacteria therethrough. Hence, upon standing, oxygen may breathe through the foil and thus maintain the packaged and sterilized baked bread fresh. While various synthetic foils are known which are resistant to the passage of gases and liquids, it has been found, in accordance with the present invention, that within the critical thickness below 0.15 mm. noted above, the polyolefin foil, and especially polyethylene foil, permits the desired permeation therethrough of oxygen.

A polyolefin foil thickness of more than about 0.15 mm. leads to rapid aging of the bread and also of the foil with the result that the danger of breakage or rupture of the foil is increased. A foil thickness of less than about 0.03 mm. is undesirable since the danger of injury to the foil is also increased because of the inherent mechanical weakness of such a thin foil.

The polyolefin foil material, significantly, should be essentially free from softeners or plasticizers since the presence of these ingredients in the foil may detrimentally affect the baked bread upon standing. Specifically, bread, during storage in the foil, may take up these ingredients whereby the taste, freshness, etc. of the packaged product will be adversely affected. Moreover, the foregoing foil must be resistant to heat deformation at sterilizing temperatures up to about 120° C. and especially 105–110° C.

The moistening step of the surface of the mass of baked goods may be carried out by wrapping the mass in moist wrappings, such as a moist cloth, the moistening being carried out for a period of from 1 to 3 hours, but preferably about one hour. On the other hand, the moistening of the surface of the mass may be carried out by subjecting the mass to contact with steam for the same period of time, though preferably between about 1 to 2 hours. The stream treatment may be effected conveniently in a closed zone, additionally containing water vapor.

The sterilization may be practiced at a temperature of about 90 degrees C. in accordance with a preferred feature of the invention, using hot air saturated with steam, or, alternatively, a water bath in which the packaged bread is immersed, for this purpose. During the sterilization, the mass may be situated on a support having a low coefficient of heat conduction or heat radiation, each foil package being separated from adjacent foil packages so that uniform heat distribution will be possible during the sterilization. Upon the termination of the sterilization of the foil-packaged baked bread mass, the same is immediately rapidly cooled to a temperature below room temperature, i.e. between about 10 and 0° C. within about ½ hour in order to enhance the durability qualities of the mass being stored by increasing the effect of the sterilization. It has been found in this connection that if the rapid cooling step is omitted, a rapid regeneration of microorganisms may occur during storage of the bread at room temperature.

In accordance with a specific embodiment of the invention, therefore, a process for packaging freshly baked bread is contemplated in which the bread mass is cooled and aged by allowing the bread to stand for a period of from 6 to 20 hours immediately after baking, then moistened to the extent of increasing by 0.5 to 5% (based on the moisture content of the whole bread) the moisture content along the surface to soften slightly the outer crispy crust of the bread mass without softening the interior thereof, and then hermetically sealed in a flexible, heat-sealable polyolefin foil, essentially free from plasticizers and softeners and having an inside volume between about 25 and 50% greater than the volume of the bread mass, under a vacuum of between about 0.3 and 0.8 atmosphere absolute so that the foil is maintained in surface contact with the bread mass. The sterilization is carried out preferably between about 90 and 100 degrees C. for a period of about 1 to 2.5 hours sufficient to effect sterilization of the bread, and finally the hot packaged bread is rapidly cooled to between about 10 and 0° C.

More particularly, where the bread is sliced, as for example prior to the sealing in the foil or prior to the moistening step, the bread mass disposed in sealed condition within the polyolefin foil, such as a polyethylene foil having a thickness between about 0.03 and 0.1 mm., may be discretely placed upon a support surface of aluminum or ceramic material so that the cut slices are maintained in a substantially horizontal plane, the sterilization being effected conventionally at about a temperature of 90 degrees C. The resulting foil-packaged bread mass then may be rapidly cooled to a temperature between about 10 and 0 degrees C. for improving the durability of the bread in storage and for specifically avoiding the regeneration of any microorganisms therein.

With respect to the first step in accordance with the process of the invention, the baked bread, upon being removed from the baking oven at about 100° C., must be stored for a period of time sufficient to allow the pore-framework of the initially soft, hot baked bread, to stabilize and solidify. Even though the baked bread has become sufficiently cooled, the same must still be stored for an additional period of time in order to effect a certain degree of internal drying and solidifying of the moist baked mass. Thereafter, the bread may be moistened on its surface and then inserted into the foil so that the subsequent steps may be carried out. The storage or waiting time between the removal of the baked goods from the oven and the filling of such goods into the foil, of course, depends somewhat upon the type of bread in question. Above all, this waiting time or aging period depends upon the type of flour used in the bread and also whether a crust-free mass or a bread mass with a pronounced crust is being baked and packaged. Generally, the waiting time or aging period amounts to between about 6 and 20 hours, such waiting time being within the upper part of the range as more rye flour is contained in the bread, for example. In this connection, where pure rye bread is being baked, the optimum waiting time is about 10–14 hours, but may be extended in any particular case to about 20 hours if desired. In a mixed bread, for example, one containing rye flour and wheat flour in admixture, in a ratio of 1:1, the waiting time amounts to about 6–8 hours. On the other hand, where pure wheat bread is baked, for example, white bread, it is not usually necessary to age the bread longer than about 6 hours. Nevertheless, it will be appreciated that very much shorter periods of time, for example, below 5 hours, are undesirable. An aging period of more than 15 to 20 hours is without adverse effect on the bread but undesirable from an economical point of view.

Once the bread has been correctly cooled and aged, the same is now solid enough for slicing, and if the bread is to be sliced, this operation may take place at this point. Where cooled and aged bread is concerned, a further difficulty is present insofar as the bread possesses hard, projecting portions in the bread crust, which, under the usual conditions, lead frequently to the injury of the foil in contact therewith. This drawback may be readily overcome in accordance with the invention by subjecting the bread, even after the same has been sliced, to the second step moisture treatment indicated above, i.e. wrapping the bread in a moist cloth or steaming the bread, for a period of 1–3 hours, but at least one hour. The steam treatment preferably takes place in a particular type of conditioning chamber having an atmosphere enriched with water vapor. On the other hand, the moisture treatment may be carried out as aforesaid by the application of moist cloth to the bread. The moistening treatment may be performed on the bread as a whole or on the bread cut into slices. In either instance, the bread crust must be sufficiently softened along the outermost portion thereof, so that the projecting points thereof are unable to exert any tearing or puncturing action on the foil during the insertion of the bread into the foil. At the same time, the bread as a whole must still remain sufficiently hard and solid. Therefore, this moisture treatment is contemplated only for softening the hard projection points in the crust of the baked goods by the absorption of from 0.5 to 5% moisture (based on the moisture content of the whole bread) in the surface portion only, without adversely affecting the original condition of the interior of the bread itself. Hence, if the moistening step takes place after the bread has been sliced, the slices must be kept in tight abutting relation to prevent moisture, meant only for the bread outer surface, from coming into contact with the bread interior, i.e. across the flat portions of the bread slices.

Once the baked goods have been properly aged and moisture treated, the baked mass in integral form or in sliced form is introduced during the third step into the polyolefin foil packaging material. As aforesaid, care must be taken that the foil portion used is somewhat larger than is necessary for just covering the bread completely. It is sufficient if the excess volume of the foil amounts to about 25 to 50% of the volume of the baked bread, i.e. the foil volume being 125 to 150% of the volume of the bread, referred to the expanded or hollow condition of the foil. One reason for requiring a slightly larger foil volume is to allow room for expansion for vapors which may possibly develop during extended storage of the baked goods. Once the baked bread has been packed into the foil, the interior of the foil is subjected to a partial vacuum in order to decrease the pressure and allow the foil to come into close contact with the surface of the bread. This may take place, for example, by placing one end of the foil between the jaws of a welding or heat-sealing apparatus with the open end of the foil being placed upon a small opening through which an evacuation tube is introduced. Upon permitting the suction of air from within the foil to take place by the vacuum created through the evacuation tube, the foil is pressed by the surrounding atmosphere into close contact with the baked mass. Generally, it is sufficient for the air pressure within the interior of the foil to be reduced to about 0.8 atmosphere absolute, and while a more extensive reduction in the pressure may be desired under some circumstances, in most cases, it is not necessary to go below 0.5 atmosphere absolute.

In this connection, going below 0.3 atmosphere absolute is undesirable since the bread will give off too many vapors and gases under such high vacuum, and this will adversely influence the sensitive qualities of the bread. On the other hand, exceeding 0.8 atmosphere absolute is also undesirable since higher internal pressures will be generated in the sealed foil during the sterilization which might lead to the danger of bursting the foil.

In accordance with another feature of the invention, the main portion of the air may be removed from the foil containing the baked mass by the attachment of a pair of pressure plates on parallel sides of the mass, i.e. outside of the foil. Upon slightly pressing these plates together, the bread mass is also pressed within the foil interior so as to decrease the volume of the package in question. This is especially suitable where sliced bread is concerned, since the plates serve to maintain the slices in compact condition, i.e. even to the extent of reducing the foil volume to ½ of the original volume due to squeezing out of air from the foil interior. While still in compacted condition, the open end of the foil must be sealed, preferably as close to the adjacent bread end as possible for maintaining the reduced volume condition of the package, and the plates removed only thereafter.

Thus, in the case where the partial vacuum has been obtained within the foil by subjecting the foil to an evacuation treatment, as well as in the case where the foil and bread have been pressed together by pressing plates to reduce the content of air within the foil, the sealing of the foil takes place immediately thereafter by welding or bonding the open end. This may be carried out effectively by placing the open end between the jaws of a heat-sealing apparatus, to which heat is supplied electrically or in some other way as for example to achieve a bonding temperature of about 120° C. The supplied heat serves to adequately bond the foil surfaces at the open end portion in the manner desired. It will be appreciated in this regard that the welding or bonding step must be such that an intimate, absolutely tight connection is obtained, since otherwise the seam will leak during the subsequent sterilization step. Accordingly, the welding or bonding jaws must be sufficiently hot, e.g. 120° C., to achieve the desired fusion of the foil surfaces being bonded together and the jaw pressure must be maintained until the bonded seam has cooled.

In accordance with a specific embodiment of the invention, a current surge for a period of less than a second will suffice for achieving the desired fusion and heat sealing of the foil, while the cooling should be carried out for about 10–20 seconds under the pressure of the bonding jaws before the sealed portion of the foil is removed from pressure contact therewith.

Therefore, in order to effect the hermetic sealing, the flexible polyolefin foil must be air-and-moisture-tight. Polyethylene has proven particularly suitable for this purpose as the same may be very easily hermetically sealed, as for example by heat sealing techniques. The polyethylene foils used as aforesaid should have a thickness of about 0.03 to 0.1 mm.' and even a volume of about 125 to 150% of the volume of the baked goods to be packaged, as for example, the pile of sliced bread. Assuming the polyolefin foil has only one open end, the sealing under vacuum of such end may be effected by placing the bread or other baked goods in the plastic bag, withdrawing the air from such open end, and effecting the sealing in the foregoing manner. Where a tubular foil is being used, of course, first one end must be sealed before the air may be withdrawn from within the foil, so that the other end may be effectively sealed to produce the desired packaging. By withdrawing sufficient air so that the remaining pressure in the hermetically sealed wrapping is about ½ an atmosphere absolute, and then sealing an optimum packaging is achieved, such that the subsequent sterilization may be efficiently carried out.

The evacuation step may be performed by suctioning out the air from the opening of the polyolefin foil containing the bread to be sterilized. In another embodiment of the invention the polyolefin foil containing the bread mass may be placed in an evacuation chamber, and upon closing the chamber, evacuating the closed chamber, sealing the polyolefin foil within the closed and evacuated chamber and reopening the said chamber after sealing the foil and after an appropriate cooling period for the heat seal.

It will be appreciated that baked bread, packaged in the foregoing manner, may be sterilized by conventional methods without detriment to the packaging, since equilibrium between the air pressure in the wrapping and the atmospheric pressure is produced during the heat sterilization. Therefore, the wrapping is not subjected to any greater stresses than it is in the normal outside air. This feature prevents cracks in the wrapping, any rupturing, or a subsequent opening of the wrapping which might otherwise take place in order to relieve the excess pressure. Hence, a completely dependable sterilization is produced with the packaged product in accordance with the invention, such sterilization lasting for months, as evidenced by the durable condition of the packaged product after prolonged storage without refrigeration and under normal conditions.

The sterilization, in accordance with the fourth step, must be effected, of course, at a temperature below the melting and decomposition temperature of the polyolefin material of which the foil is composed and/or below the temperature at which deterioration of the polyolefin material occurs. Thus, the sterilization temperature depends upon the softening temperature of the foil used. Where conventional polyethylene is concerned, having a melting point somewhat above 100 degrees C., temperatures of sterilization below this temperature are preferred. Generally, the sealed foil packages containing the bread are exposed for a prolonged period of time of from 1 to 3 hours, and preferably from 1 to 1.5 hours, to an increased temperature of at least above 70 degrees C., and preferably between about 90 and 100 degrees C. Temperatures above 100° C. are not normally to be considered since they place too great a stress on the foil under the temperature and pressure conditions during the sterilization, unless the foil is resistant to heat deformation at temperatures above 100° C., i.e. 120° C.

It will be appreciated that the sterilization step in accordance with the invention differs fundamentally from the sterilization of bread as previously carried out, for example, where the bread was packed in aluminum foil. In that case, the bread packages were disposed compactly one against the other, and thence exposed to relatively high temperatures. While this expedient was successful in the case of bread packaged in aluminum foil, it is not possible to subject bread packages tightly sealed in polyolefin foil to such high temperatures without impairing the integrity of the foil in question. Furthermore, it is necessary that the heat be supplied to the individual bread packages within the foil on all sides such that the core or center of the bread will become heated at least for a period of 1 hour at 70 degrees C., and where it is desired to neutralize or destroy chalk mold, the center of the bread should be heated for a period of at least 1 hour to at least 77 to 81 degrees C. At these conditions the outer sterilization temperature must be more than 80° C. Temperatures lower than 80° C. are admissible if it is not desired to destroy any chalk mold. In order to attain the favored exposure of all sides of the packaging to the sterilization heat in an even manner, of course, the packages must be spaced at intervals from one another during the sterilization treatment, i.e. where a plurality of packaged products are being sterilized simultaneously.

With specific reference to fresh bread, and particularly pumpernickel, sterilization at a temperature of about 90 degrees C. in hot air completely saturated with steam for a period of about 1.5 to 3 hours has proven particularly satisfactory. The material being sterilized should be maintained at a temperature of at least 77 to 81 degrees C. as aforesaid throughout its entire mass during this period of time. Such result is attained by using the hot air at a temperature of 90 degrees C. whereby the difficultly destroyable chalk mold bacteria are effectively destroyed within an hour or an hour and a half. Alternatively, the bread may be subjected to sterilization in a water bath having a temperature of about 90 degrees C. as well. For this treatment, a sterilization period of about 2¼ hours is certainly sufficient for destroying the chalk mold bacteria whereas the other mold bacteria are destroyed within about an hour or an hour and a half. The sterilization in accordance with the hot water bath embodiment has the further advantage that a certain back pressure is exerted on the surface of the packaging by the water so that any possible leak tendency in the vacuum of the foil of the individual packages is compensated for since the foil is protected from undue stresses.

The foregoing temperatures have been found to be well tolerated by the foils used and to permit a sufficient sterilization to be carried out within a relatively short period of time, whereby packaged baked goods, such as bread, may be stored for an extended period of 9 months and even longer under normal room conditions.

Where packaged sliced bread is concerned, the bread mass should be sterilized preferably with the cut surfaces positioned as horizontally as possible so that the individual slices of the package do not tend to fan out or spread apart and thereby subject the wrapping to additional stresses. Furthermore, if the sterilization is effected in the saturated steam-hot air operation rather than in a water-bath operation, it is preferred to place the package on a support having a poor coefficient of heat conductivity or heat radiation. Polyethylene foils tend to stick to other supports and are otherwise easily injured upon removal after the sterilization step. The tendency of the foil sheets toward sticking to the supports decreases correspondingly with a decrease in the coefficient of heat conductivity or heat radiation of the support in question. For this reason, enameled steel plates, and the like, may be conveniently used. Suitable materials having a low coefficient of heat conductivity include ceramic materials, such as china, porcelain, marble, alumina, magnesia, etc., and any of these may be used as the support having a low coefficient of heat conductivity. In the same way, a support of aluminum metal may be used as one having a low coefficient of heat radiation. The packages of sliced bread, as noted above, should have their cut surfaces arranged horizontally on horizontal supports of the foregoing materials, the positioning being such that the individual packages are discretely spaced from one another to permit exposure of all sides of the package to the sterilization heat.

The bread, after the sterilization step, should be rapidly cooled in a fifth step as aforesaid, from the sterilization temperature to a temperature of 10° C. and preferably between 10 and 0° C. within ½ hour. After such cooling step, once the package reaches room temperature again, the internal pressure in the package decreases to the initial vacuum pressure under which the hermetic sealing was effected, the correspondingly higher external ambient pressure of the atmosphere causing the wrapper to be pressed closely once more into surface contact against the product mass therewithin. The behavior or reaction of the foil wrapping to the cooling constitutes at the same time an accurate test as to whether the foil wrapping has remained absolutely air-tight during the sterilization. The temperature of the cooling chamber should be lower than the cooling temperature which is to be obtained within the cooled bread. The temperature of the cooling chamber therefore in general would be lower than 0° C.

Most plastic foils suitable for the packaging of foods grow on expand upon heating, i.e. during the sterilization, and the growth continues even after the cooling from the sterilization temperature. This growth, therefore, may be taken into consideration when determining the area size of the wrapping foil as compared to the outer surface area of the baked bread mass being wrapped.

On the other hand, certain heat-shrinkable foils are known which have been used in the past for packaging various foods. While the phenomenon of shrinking a foil may be desirable where a tight-packaging is to be produced, the process of the present invention does not contemplate the use of such heat-shrinkable foils. The use of heat in processes contemplating heat-shrinkable foils is merely for the purpose of shrinking such foils and not for sterilization purposes. This is especially evident from the short period of heating used for such shrinking. This would be insufficient for sterilizing any foodstuff, and especially baked bread which must be heated for at least an hour at higher temperatures after the sealing of the foil has taken place. While the use of heat-shrinkable foil leads to the deformation of the original disposition of the packaged goods, the usual flexible, heat-sealable polyolefin foil contemplated by the present invention, expands or grows somewhat during the sterilization, so that upon subsequent cooling, sufficient loose contact between the foil and the baked mass is attained which permits the desired visual inspection of the product within the foil.

Due to the nature of the sterilization step, it will be appreciated that the same may be carried out under atmospheric conditions and need not be performed in an autoclave under high pressure. While autoclave sterilization has been necessary for certain packaged food, especially where an ambient pressure is required to prevent the bursting of the sealed foil packages, by reason of the inherent properties of bread, no excessive pressures are built up during the sterilization which would require a counter pressure to prevent bursting of the foil. A much simpler and more economical procedure is, therefore, possible using an open water bath or a steam-air bath at ambient pressure.

Hence, for obtaining the packaged baked bread in accordance with the invention, it is important that the foil used, on the one hand, be sufficiently resistant to the individual operations, showing adequate mechanical and thermal stability, and, on the other hand, exhibit during prolonged storage an absolutely safe seal against the penetration of germs and spores, of mold, bacteriae, and other harmful microorganisms, while at the same time being free from additives, such as softeners or plastifiers which give off taste-disturbing or otherwise detrimental substances to the packaged product. It is for this reason that in accordance with the preferred process of the invention only softener-free or softener-poor foils are concerned, such as polyethylene or polypropylene foils which are non-heat-shrinkable, and by reason of the critical thickness of 0.03–0.1 mm. are oxygen-permeable, yet simultaneously impermeable to entry of microorganism, bacteriae, etc. therethrough. Where a polyolefin foil of the foregoing type is used, which is essentially free of plasticizers or softeners, the foil has the propensity to breathe oxygen therethrough for maintaining the freshness and durability of the baked goods, the thickness of the foil suitably being about 0.03 and 0.08 mm. Polyethylene foil of 75 micron thickness (0.075 mm.) sold by the firm of Kalle & Co. in Germany under the name "Suprathen N75," has demonstrated itself to be particularly suitable for this purpose, as well.

It will be appreciated by the artisan that the type of foil somewhat influences the extent of time necessary for the sterilization step. Where the foil used is more temperature-resistant, e.g. at least about or above 120° C., higher temperatures, in the range of up to 120° C., and shorter sterilization times will naturally be used.

In accordance with the invention, therefore, a solid, ready-to-eat food packaged in foil, evacuated and heat sterilized, is provided wherein the steps used avoid the destruction of the packaging container or foil even during the sterilization, such sterilization being effected in a simple manner without the requirement for irradiation or autoclave pressures as have been used in the past. No cooking of the bread is contemplated in accordance with the present invention, since such bread is baked bread, i.e. per se already cooked goods, which is treated immediately upon removal from the baking oven. Unlike naturally obtainable foods, such as meats, fruits, and vegetables, bread is a synthesized product not used nor prepared in integral form as grown, and therefore having critical characteristics not found in foods which are processed for packaging essentially in the form in which they are grown. Baked bread must have a critical moisture content and inherent microorganisms present therein must be neutralized or destroyed to prevent the deterioration of the goods upon prolonged storage. The ideal sterilization techniques used in accordance with the features of the present invention permit the microorganisms and bacteria present in the baked bread to be destroyed without adversely affecting the texture, flavor, appearance, freshness, etc. of the product, in spite of the critical nature of these characteristics. Since bread becomes stale after a comparatively short period of time and since cracks appearing in the bread detract from its texture and salable appearance, the criticality of the properties of this synthesized product may be readily appreciated.

Hence, the sequence of steps used to prepare the packaged baked bread in accordance with the present invention achieves the desired goal, so as to prevent mold, mildew, etc. for prolonged storage, even in excess of 9 months, without drying out the baked bread or rendering the same old-tasting, etc. upon storage. Considering the critical moisture content necessary for preserving the texture, flavor, freshness, appearance, etc., and the ease with which these qualities are destroyed, it is surprising that the present invention achieves the desired end of destroying during the sterilization even the particularly highly resistant bacterial strains normally contained in bread without impairment of the desired qualities of the product. Since no excessive moisture is present within the sealed foil package, the foil interior is not adversely affected during sterilization which might otherwise lead to the rupture of such foil or the development of leaks by generation of excessive internal pressure during the heating.

The baked bread disposed in the foil in sterilized form and under vacuum, as prepared in accordance with the present invention, permits not only visual inspection of the mass within the foil package, even after prolonged storage so as to recognize possible appearance of putrefaction phenomena within the package, but also the convenient storage within a volume defined by the baked goods themselves even up to 9 months and longer, the bread being still fresh and palatable after this period of time. By reason of the fact that the baked bread is packaged under vacuum, one can readily ascertain whether or not the package contains any leakage, since if leakage occurs, the foil will cease to abut tightly against the bread and will not return to its original position in close contact with the ingredients therewithin when manually pulled away from the same. Most effective results are achieved in accordance with the present invention where rye-course meal bread, pumpernickel, rye bread or mixed flour breads are concerned.

The following examples are given by way of illustration and not limitation:

EXAMPLE 1

*(a) For the baking of pumpernickel bread*

Upon mixing 500 gm. coarse rye flour of the type 1800 (i.e. where 1.8 kg. ash (combustion residue) are contained in each 100 kg. of coarse flour), 300 gm. water, 1% yeast and 1.5% salt, 500 gm. are pretreated for 8 hours in hot water, the temperature of the water being more than about 60° C. Then the ingredients are placed in a container and inserted into a steam chamber oven for baking. The baking takes place over a period of 18 hours to 30 hours at 100° C. and then the bread is removed from the oven. The baked bread mass has increased in size about 10% as compared with the size of the prebaked mass, and in the 110% baked form has the approximate dimensions 120 x 100 x 70 mm. It will be noted that the baking period and the baking temperature of this example are illustrative only, and not limitative. These conditions may be varied, as for example, the baking treatment may be performed in ovens of other types, such as gas heated ovens, or by using other types of flour or other ingredients. This will be the case if it is desired to prepare rye-whole-meal bread instead of pumpernickel.

*(b) For the aging and moistening pre-treatment of fresh-baked pumpernickel*

Pumpernickel bread having a size of 120 x 100 x 70 mm. as taken from the baking oven is immediately cooled from the baking temperature of about 100° C. to room temperature for 6 hours and allowed to age, and at the expiration of this time the bread is wrapped with a moist cloth which remains on the bread for 1 hour, so that the bread takes up 0.5 to 1% moisture (based on the moisture content of the whole bread) on its surface. After the aging, the bread is stable and solid to touch with a relatively firm crust containing hard projections, whereas the bread as taken from the oven is soft and pliable. Upon treatment with the moist cloth, the bread is still firm and resilient yet the crust is no longer crispy and the hard projections have been rendered soft and innocuous.

The so-treated bread is then sliced and subjected to the following treatment for sealing and sterilizing the same in a polyethylene bag.

*(c) For the packing and sealing of fresh-cut pumpernickel*

The individual slices of pumpernickel which are of equal size are piled so as to form a stack of a size of about 120 x 100 x 70 mm. This corresponds approximately to a weight of 500 grams, i.e., to a weight which is customary for sale. This pile is then placed in a bag consisting of a transparent polyethylene sheet of a thickness of 0.04 mm. which is free from softeners and plasticizers and resistant to heat deformation at temperatures up to about 110° C.

The polyethylene bag may be made for instance from a seamless tube of a circumference of 350 mm. and a length of 230 mm. by heat sealing at about 120° C. one end with a seam 3–5 mm. thick spaced 10 mm. from the edge.

The other open end of the bag is then clamped on the nozzle of a vacuum pump and evacuated down to 0.5 atmospheres absolute. After this degree of vacuum is reached, this end of the bag is pressed together in a vacuum-tight manner at the portion between the nozzle and the stack of bread, and then hermetically sealed closed at 120° C. in a seam of a width of 3 to 5 mm. parallel to its opening. Thereupon the bag can be removed from the nozzle of the vacuum pump and the protruding bag end possibly cut off to a length of about 15 mm. from the edge of the seam. The pile of bread is then recovered enclosed in a vacuum-tight and moisture-tight manner in a wrapping of an inside length of about 120 mm., an inside width of 100 mm. and an inside height of about 70 mm. Due to vacuum, the wrapping rests closely, under the external pressure, around the bread bag, in which connection all details of the bread can be observed readily through the transparent wrapping.

*(d) For the sterilizing of the packaged bread*

In this sealed condition, the bag is placed upon an enameled plate with the cut surfaces of the bread parallel to the plate and immersed in a water bath of a temperature of about 90° C. for 1½ to 3 hours, depending on the degree of sterilization desired. During this treatment the bag expands somewhat.

*(e) For rapid cooling of the sterilized bread*

Immediately after the sterilization, the plate support bearing the packed pumpernickel is set in a refrigerator maintained at 10° C. and rapidly cooled, from the sterilization temperature to 10° C. within about ½ hour after being placed in such refrigerator. Each bread bag is then removed from the refrigerator and allowed to return to room temperature.

Thereupon a plurality of pumpernickel bags is finally packed in large cartons in the customary manner as is usual in the trade. The bread may be preserved this way at room temperature for 9 months, and even longer without impairment of the desired properties of the bread, e.g. freshness, texture, appearance, flavor, etc. In this regard, during the immersing in the water bath, it can already be noted whether the sealed seams are satisfactory. If not, air will escape from the wrapping. After sterilization, the residual air still enclosed in the bag cools down during the rapid cooling step so that the wrapping rests closely against the bread bag, i.e. even after the bread returns to room temperature,

EXAMPLE 2

Example 1 is repeated with an aging time of 10 hours; using the alternate moistening step of steam treatment of the bread in a closed vessel additionally containing water vapor for a period of 1 to 2 hours to increase the surface moisture of the bread by about 4 to 5%; and without slicing, carrying out the subsequent steps of placing the bread in the polyethylene bag, in this case having a thickness of 0.075 mm., squeezing the bread to about ½ the original volume and hermetically heat sealing the opening in the bag close to the adjacent side of the bread; thereby forming a vacuum of 0.5 atmosphere absolute in the bag; sterilizing the sealed bread on an aluminum plate in a closed vessel at about 90° C., using hot air completely saturated with steam, for a period of about 2½ hours; and finally rapidly cooling the hot sterilized bread in a refrigerator maintained at 0° C. within ½ hour to 0° C. The so-packaged bread is then recovered and allowed to return to normal room temperature. The bread may be preserved in the same way as in Example 1 for over 9 months at room temperature without impairment of the desired properties of the bread.

Although this invention has been described in detail with reference to certain specific embodiments, various changes and modifications will become apparent to the artisan which fall within the spirit of the invention and the scope of the appended claims.

What is claimed is:

1. Process for packaging freshly baked bread which comprises aging the baked bread mass by allowing the mass to stand for a period of at least about 6 hours immediately after baking to cool and structurally stabilize the hot soft mass, moistening just the surface of the mass to soften slightly the outermost crispy surface portion thereof without softening the interior portion of such mass, hermetically sealing the mass in a flexible, heat-sealable polyolefin foil having a thickness of at least about 0.03 mm. and below about 0.15 mm. under a vacuum of at least about 0.8 atmosphere absolute, sterilizing the mass hermetically sealed in the foil at a temperature between about 70 and 120° C. for a period of about 1 to 3 hours, and immediately thereafter cooling the sterilized hermetically sealed mass rapidly to at least about 10° C.

2. Process according to claim 1 wherein said baked bread mass is sliced bread and the expanded volume of the sealed polyolefin foil containing the bread is between about 25 and 50% greater than that of the bread.

3. Process according to claim 1 wherein the aging is effected for a period between about 6 and 20 hours, the moistening is effected for a period between about 1 and 3 hours to take up between about 0.5 and 5% moisture in the bread surface, the hermetic sealing is effected under a vacuum between about 0.3 and 0.8 atmospheres absolute in a transparent, flexible polyolefin foil essentially free from softeners and plasticizers and having a thickness between about 0.03 to 0.1 mm. and a volume of about 125–150% of the volume of the baked goods mass, and the sterilizing is effected at about 90 to 100° C. to achieve a sterilizing temperature of between 77 and 87° C. in the interior of the bread mass.

4. Process according to claim 3 wherein said foil is a polyolefin foil having a thickness of about 0.03–0.08 mm. slightly permeable to oxygen and resistant to heat deformation at temperatures at least to about 105–110° C.

5. Process according to claim 1 wherein the moistening of the surface of the mass is effected by wrapping the mass in moist cloth for a period of about 1 hour.

6. Process according to claim 1 wherein the moistening of the surface of the mass is effected by subjecting the mass to contact with steam for a period of between about 1 to 2 hours.

7. Process according to claim 6 wherein the contact with steam is effected in a closed zone additionally containing water vapor.

8. Process according to claim 1 wherein the sterilization is effected at a temperature of about 90° C. in hot air saturated with steam.

9. Process according to claim 1 wherein the sterilization is effected at a temperature of about 90° C. in a water bath.

10. Process according to claim 1 wherein the sterilization is effected with the mass situated on a surface having a low coefficient of heat conduction.

11. Process according to claim 1 wherein the resulting foil-packaged hot mass immediately after sterilizing is rapidly cooled to between about 10 and 0° C. within about ½ hour, the bread mass being compressed within the foil prior to sealing, and the sealing being carried out so that the foil is closely wrapped about the compacted bread mass on all sides, whereby upon sealing the foil and upon return of the bread mass to the original volume, said bread mass will be under a vacuum of about 0.5 atmosphere absolute within the sealed foil.

12. Process for packaging freshly baked bread which comprises aging the bread mass by allowing the bread mass to stand for a period of from 6 to 20 hours immediately after baking to cool and solidify the hot soft mass, moistening the surface of the mass by wrapping the mass in a moist wrapping for a period of about 1 hour to take up about 0.5 to 1% moisture in the bread surface and thus to soften slightly the outer crispy crust of the bread mass without softening the interior of the mass, removing the wrapping and hermetically sealing the mass in a flexible, heat-sealable polyolefin foil having a thickness of at least about 0.03 mm. and below about 0.15 mm., essentially free from plasticizers and having an inside volume between about 25 and 50% greater than the volume of the bread mass, under a vacuum of between about 0.3 and 0.5 atmosphere absolute so that the foil is maintained in surface contact with the bread mass, sterilizing the mass hermetically sealed in the foil at a temperature between about 90 and 110° C. for a period of about 1.5 to 2.5 hours sufficient to effect sterilization of the bread, and immediately thereafter rapidly cooling the sterilized hermetically sealed hot bread mass to at least about 10° C., and recovering the so-packaged bread after the cooling.

13. Process according to claim 12 wherein said bread is sliced prior to sealing in the foil, said foil being a transparent, flexible polyethylene foil having a thickness between about 0.03 to 0.08 mm., and said sterilizing is effected at a temperature of about 90° C. in hot air saturated with steam with the bread mass situated discretely on a surface of aluminum having a low coefficient of heat radiation, such that the cut surfaces of the slices are maintained in a substantially horizontal plane, the resulting foil-packaged bread mass being immediately thereafter cooled within ½ hour to a temperature between about 10 and 0° C.

14. Process according to claim 12 wherein said bread is sliced prior to sealing in the foil, said foil being a transparent, flexible polyethylene foil having a thickness between about 0.03 to 0.08 mm., and said sterilizing is effected at a temperature of about 90° C. with the sealed bread mass immersed in a water bath and situated discretely on a surface of ceramic material having a low coefficient of heat conduction, such that the cut surfaces of the slices are maintained in a substantially horizontal plane, the resulting foil-packaged bread mass being immediately thereafter cooled within about ½ hour to a temperature between about 10 and 0° C.

15. Process for packaging freshly baked bread which comprises aging the bread mass by allowing the bread mass to stand for a period of from 6 to 20 hours immediately after baking to cool and solidify the hot soft mass, moistening the surface of the mass by subjecting the mass to contact with steam in a closed zone additionally containing water vapor for a period of between about 1 to 2 hours to soften slightly the outer crust of the bread mass without softening the interior of the mass, and hermetically sealing the mass in a flexible, heat-sealable polyolefin foil having a thickness of at least about 0.03 mm. and below about 0.15 mm., essentially free from plasticizers and having an inside volume between about 25 and 50% greater than the volume of the bread mass, under a vacuum of about 0.3 and 0.5 atmosphere absolute so that the foil is maintained in surface contact with the bread mass, sterilizing the mass hermetically sealed in the foil at a temperature between about 90 and 110° C. for a period of about 1.5 to 2.5 hours sufficient to effect sterilization of the bread, and immediately thereafter rapidly cooling the sterilized hermetically sealed hot bread mass to at least about 10° C., and recovering the so-packaged bread after the cooling.

16. Process according to claim 15 wherein said bread is sliced prior to sealing in the foil, said foil being a transparent, flexible polyethylene foil having a thickness between about 0.03 to 0.08 mm., and said sterilizing is effected at a temperature of about 90° C. in hot air saturated with steam with the bread mass situated discretely on a surface of aluminum having a low coefficient of heat radiation, such that the cut surfaces of the slices are maintained in a substantially horizontal plane, the resulting foil-packaged bread mass being immediately thereafter cooled within about ½ hour to a temperature between about 10 and 0° C.

17. Process according to claim 15 wherein said bread is sliced prior to sealing in the foil, said foil being a transparent, flexible polyethylene foil having a thickness between about 0.03 to 0.08 mm., and said sterilizing is effected at a temperature of about 90° C. with the sealed bread mass immersed in a water bath and situated discretely on a surface of ceramic material having a low coefficient of heat condition, such that the cut surfaces of the slices are maintained in a substantially horizontal plane, the resulting foil-packaged bread mass being immediately thereafter cooled within about ½ hour to a temperature between about 10 and 0° C.

References Cited by the Examiner

UNITED STATES PATENTS 2,380,134   7/45   Waters _____ 99—182

OTHER REFERENCES

Bakers Weekly, Nov. 1, 1954, page 47.
Cathcart et al.: Food Technology I, No. 2, April 1947, pages 174–177.

A. LOUIS MONACELL, *Primary Examiner.*